(12) United States Patent
Eilerts

(10) Patent No.: US 6,479,422 B1
(45) Date of Patent: Nov. 12, 2002

(54) POLYMER HAVING A MULTIMODAL MOLECULAR WEIGHT DISTRIBUTION MADE FROM TWO DIFFERENT DIMINE CATALYSTS

(75) Inventor: Nancy W. Eilerts, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/476,479

(22) Filed: Dec. 30, 1999

Related U.S. Application Data

(63) Continuation-in-part of application No. 08/994,490, filed on Dec. 19, 1997, now abandoned.

(51) Int. Cl.[7] .......................... B01J 31/00; B01J 37/00; C08F 4/02; C08F 4/60; C08F 4/44
(52) U.S. Cl. ..................... 502/117; 502/113; 502/167; 502/170; 502/172; 526/134; 526/169.1
(58) Field of Search ................. 502/113, 117, 502/167; 516/134, 169.1

(56) References Cited

U.S. PATENT DOCUMENTS

| | | | | |
|---|---|---|---|---|
| 4,937,299 A | * | 6/1990 | Ewen et al. | 502/113 |
| 4,939,217 A | * | 7/1990 | Stricklen | 502/113 |
| 4,975,403 A | * | 12/1990 | Ewen | 502/113 |
| 5,714,556 A | | 2/1998 | Johnson et al. | 526/135 |
| 5,852,145 A | | 12/1998 | McLain et al. | 526/133 |
| 5,866,663 A | | 2/1999 | Brookhart et al. | 526/170 |
| 6,001,766 A | * | 12/1999 | Kissin et al. | 502/113 |
| 6,136,743 A | * | 10/2000 | Sugimura et al. | 502/113 |
| 6,136,747 A | * | 10/2000 | Kao et al. | 502/113 |
| 6,150,295 A | * | 11/2000 | Eilerts | 502/117 |
| 6,194,341 B1 | | 2/2001 | Canich et al. | 502/113 |

FOREIGN PATENT DOCUMENTS

| WO | WO 96/23010 A2 | | 8/1996 |
|---|---|---|---|
| WO | WO 97/48735 | * | 12/1997 |
| WO | WO 98/30609 | * | 7/1998 |
| WO | WO 99/32226 | | 7/1999 |

OTHER PUBLICATIONS

C. Pellecchia and A. Zambelli, "Syndiotactic-specific polymerization of propene with a Ni-based catalyst", *Macromol. Rapid Commun.* 17, 333–338 (1996).

* cited by examiner

*Primary Examiner*—Mark L. Bell
*Assistant Examiner*—J. Pasterczyk
(74) *Attorney, Agent, or Firm*—McDermott, Will & Emery

(57) ABSTRACT

Novel catalyst systems which comprise at least two diimine nickel complexes can be used with a co-catalyst such as methylaluminoxane in polymerization processes to produce polymers having multimodal molecular weight distributions. Also disclosed are the novel polymers obtained by the use of such catalyst systems.

40 Claims, 6 Drawing Sheets

POLYMER HAVING A MULTIMODAL MOLECULAR WEIGHT DISTRIBUTION MADE FROM TWO DIFFERENT DIMINE CATALYSTS

This application is a continuation-in-part of U.S. application Ser. No. 08/994,490, filed Dec. 19, 1997, now abandoned.

FIELD OF INVENTION

The present invention relates to olefin polymerization processes using two or more different diimine nickel (II) or palladium (II) complexes for making polyolefins having multimodal molecular weight distributions. In another aspect, the present invention relates to novel catalyst systems comprising at least two different diimine nickel (II) or palladium (II) complexes. In yet another aspect, the present invention relates to unique polyethylenes and other polyolefins made using such catalyst systems.

BACKGROUND

It is well known that mono-1-olefins, such as ethylene and propylene, can be polymerized with catalyst systems employing transition metals such as titanium, vanadium, chromium, nickel and/or other metals, either unsupported or on a support such as alumina, silica, titania, and other refractory metals. Supported polymerization catalyst systems frequently are used with a co-catalyst, such as alkyl boron compounds and/or alkyl aluminum compounds and/or alkyl aluminoxy compounds. Organometallic catalyst systems, i.e., Ziegler-Natta-type catalyst systems, usually are unsupported and frequently are used with a co-catalyst, such as methylaluminoxane.

It is also well known that slurry polymerization processes, or loop polymerization processes, are relatively more commercially desirable than other polymerization processes. Furthermore, the type of polymerization process used can have an effect on the nature of the resultant polymer. For example, higher reactor temperatures can result in low catalyst system activity and productivity, as well as a lower molecular weight polymer product. Higher reactor pressures also can decrease the amount of desirable branching in the resultant polymer.

Most polymer products made by slurry processes, especially those polymer products made using supported chromium catalyst systems, have a broader molecular weight distribution (MWD) and, therefore, the polymer product is much easier to process into a final product. Polymers made by other processes, such as, for example, higher temperature and/or higher pressure solution processes, can produce polymers having a narrow molecular weight distribution; these polymers can be much more difficult to process into an article of manufacture.

Unfortunately, many homogeneous organometallic catalyst systems have a low activity, high consumption of very costly co-catalysts, like methylaluminoxane (MAO), and can produce low molecular weight polymers having a narrow molecular weight distribution. Furthermore, even though MAO can be necessary to produce a polymer with desired characteristics, an excess of MAO can result in decreased catalyst system activity. Additionally, these types of homogeneous catalyst systems preferably are used only in solution or gas phase polymerization processes.

In general, polyolefins produced by present-day processes comprise polymers having a distribution of different molecular weights. In many cases, a molecular weight distribution (MWD) is monomodal, meaning that the molecular weight distribution generally is characterized by having a single peak or mode, as reflected by the distribution of polymer molecular weights, for example, as shown by size exclusion chromatography (SEC) curves. Also, some polyolefins made according to present-day processes generally are characterized by having a narrow molecular weight distribution. While in some circumstances it may be desirable to have a polymer having a narrow molecular weight distribution or a monomodal molecular weight distribution, in other circumstances it may be advantageous to produce a polymer having a multimodal molecular weight distribution and/or a broad molecular weight distribution.

Polyolefins having a multimodal molecular weight distribution, such as polyethylene having a bimodal MWD, can be made into articles by a variety of methods, including but not limited to extrusion molding, thermoforming and rotational molding, and have advantages over typical polyolefins lacking a multimodal MWD. In particular, it has been observed that polyolefins having a multimodal MWD can be processed more easily. For example, they can be processed at a faster throughput rate with lower energy requirements, and at the same time such polymers tend to exhibit reduced melt flow perturbations. Polyolefins having a multimodal MWD can be preferred because of improved properties for applications such as blow molding and/or high strength firms. Polymers having a multimodal MWD generally are characterized by having more than one MWD peak, or in some cases by a broad MWD, as reflected by SEC curves.

Polyolefins having a multimodal MWD can be made by several different methods. In one method, a combination of two distinct and separate catalyst systems are used in the same polymerization reactor, wherein each catalyst system on its own is known to produce a polyolefin having a MWD that is different than the MWD of the polyolefin produced by the other catalyst system. When certain catalyst systems are used in combination, the resultant polyolefins can have a bimodal or multimodal molecular weight distribution. For example, titanium and chromium catalyst systems can be employed simultaneously in a single polymerization process in an attempt to produce a polyolefin having a bimodal molecular weight distribution. However, the use of two different catalyst systems in a single polymerization reactor does not necessarily guarantee the production of a polyolefin having a bimodal or multimodal MWD. Some polymerization reactions nonetheless can yield a polyolefin having a monomodal molecular weight distribution. Furthermore, in processes using two distinct catalyst systems, it usually is difficult to control catalyst system feed rates, and one catalyst system can inhibit or impair the activity of the other catalyst systems. Also, use of a combination of two distinct and separate catalyst systems in the same reactor can lead to the formation of polymer particles that are not uniform in size. Thus, segregation of the polymer product during storage and/or transfer can produce non-homogenous polymer products.

Another method for making polyolefin product having a bimodal MWD comprises combining or blending two separate polyolefins which have different molecular weight distributions. However, this requires at least one extra step, and likely requires extra equipment and/or manpower, in the process for making the final olefin product. Furthermore, problems discussed earlier regarding segregation also can occur in this method.

Another method for making multimodal MWD polyolefins in a single reactor polymerization process involves using a catalyst system comprising two or more catalytic sites, such as, for example, metallocenes wherein each site has different propagation and termination rate constants. Again, in certain circumstances, even catalyst systems that have two different catalytic sites can produce a unimodal molecular weight distribution. Also, such catalyst systems can have decreased catalytic activity.

Accordingly, a catalyst system is desired that produces polymers having bimodal or multimodal molecular weight distributions.

SUMMARY OF THE INVENTION

It is an object of this invention to provide novel catalyst systems useful for polymerization.

It is another object of this invention to provide catalyst systems which are relatively simple to make, have increased activity and increased productivity.

It is a further object of this invention to provide catalyst systems which have reduced co-catalyst consumption.

It is another object of this invention to provide polyethylene and other polymers that have a bimodal or multimodal molecular weight distribution. It is yet another object of this invention to provide a process for making polyolefins having a bimodal or multimodal molecular weight distribution. It is yet another object of this invention.

One aspect of this invention is a catalyst system comprising a first diimine nickel (II) or palladium (II) complex and a second diimine nickel (II) or palladium (II) complex, wherein the first diimine complex has a lower molecular weight and/or smaller ligand(s) than the second diimine complex. It is further contemplated that such a catalyst system can also comprise a suitable co-catalyst such as methylaluminoxane. Another aspect of this invention is a process for making polyethylenes and other polyolefins by contacting such a catalyst system with ethylene or other olefin monomer under polymerization conditions.

Another aspect of this invention is a novel polymer having a bimodal or multimodal molecular weight distribution and in which at least some polymer having a higher molecular weight is substantially branched, or at least not insubstantially branched, and at least some polymer having a lower molecular weight is substantially linear. Another aspect of this invention is a polymer having a bimodal or multimodal MWD in which branching is concentrated in the high molecular weight portion of the MWD. Another aspect of this invention is a process for making such polymers.

In accordance with this invention, catalyst systems comprising at least two different diimine nickel complexes or diimine palladium complexes are employed. Each diimine nickel or palladium complex can comprise additional ligands selected from the group consisting of α-deprotonated-β-diketones, α-deprotonated-β-ketoesters, halogens and mixtures thereof. Preferably, the diimine nickel complexes have a formula selected from the group consisting of $Ni(NCR'C_6R_2H_3)_2$ $(E_2C_3R''_2Q)_2$ and $Ni(NCR'C_6R_2H_3)_2(E_2C_3R''_2Q)X$. Most preferably, the catalyst systems comprise two different diimine nickel (II) complexes, each of which has a formula selected from the aforesaid group. The catalyst systems further can comprise methylaluminoxane or other cocatalyst(s). Catalyst systems also can comprise other components, for example, the catalyst systems can include inorganic oxide supports. Exemplary inorganic supports include, but are not limited to, silica, alumina, titania, silica/alumina, silica/titania, silica/alumina/titania, aluminophosphate, and mixtures thereof. In particular, it can be advantageous to include aluminophosphate. Processes to make these catalyst systems also are provided.

Yet another aspect of this invention is a slurry polymerization process comprising contacting ethylene, and optionally one or more higher alpha-olefins, in a reaction zone with a catalyst system comprising at least two different diimine nickel complexes or diimine palladium complexes, which can further comprise additional ligands selected from the group consisting of α-deprotonated-β-diketones, α-deprotonated-β-ketoesters, halogens and mixtures thereof, in the presence of methylaluminoxane or other co-catalysts. In some embodiments of the invention, the catalyst systems can be heterogeneous.

DESCRIPTION OF THE PREFERRED EMBODIMENTS

Figure 1:
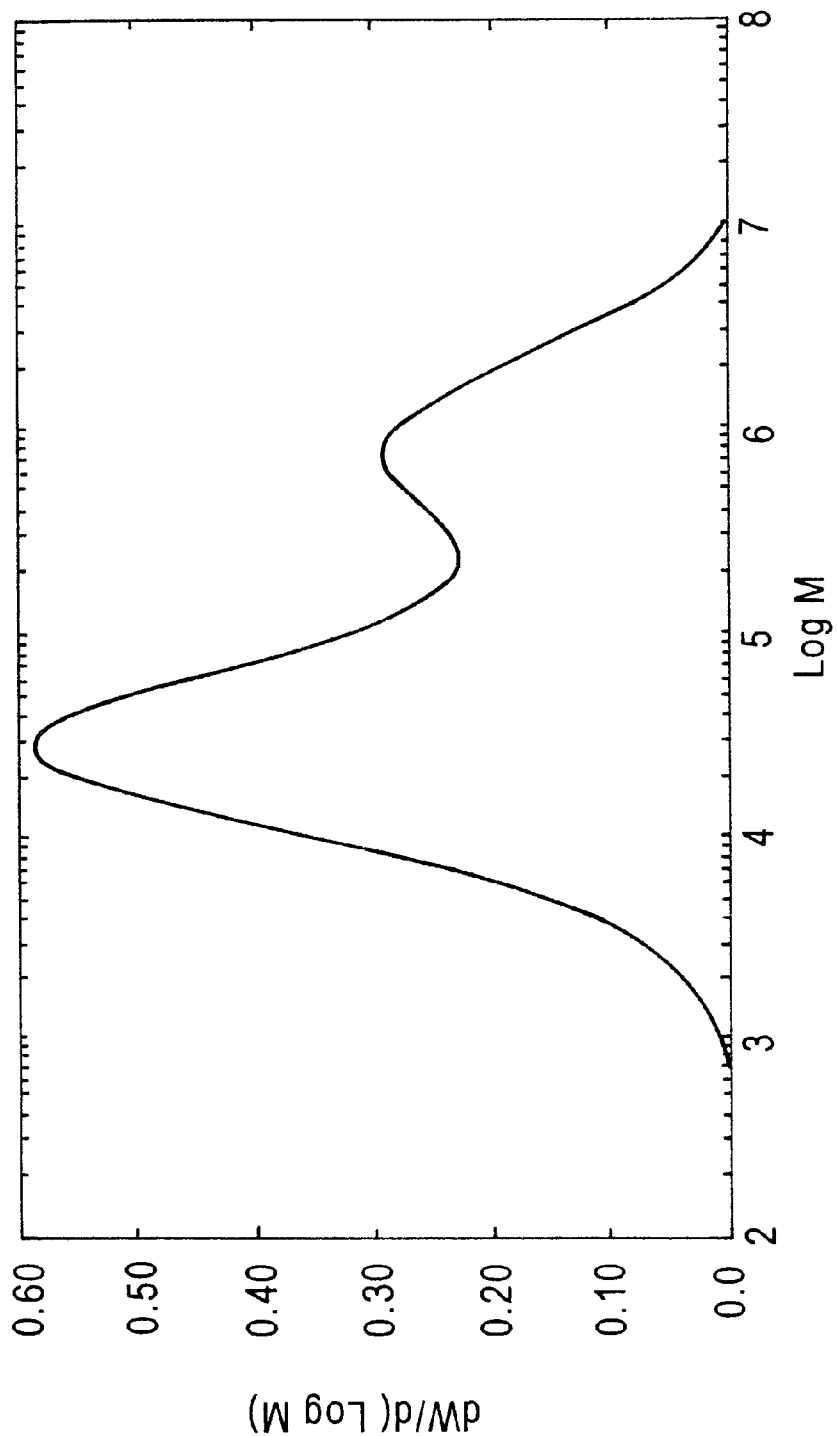
FIG. 1 is a size exclusion chromatography curve for a polyethylene sample made in an olefin polymerization process using a catalyst system comprising N,N'-bis(2,6-diisopropylphenyl)-1,2-ethylenediimine nickel (II) bis (hexafluoroacetylacetonate) and N,N'-bis(2,6-diisopropylphenyl)-2,3-butanediimine nickel (II) bis (hexafluoroacetylacetonate) as catalysts and methylaluminoxane as co-catalyst.

Catalyst systems of this invention can be characterized as comprising at least two different diimine nickel (II) compounds. Other embodiments of the present invention comprise catalyst systems comprising two different diimine palladium (II) complexes, or a diimine nickel (II) complex and a diimine palladium (II) complex. These diimine complexes generally comprise additional ligands selected from the group consisting of (α-deprotonated-β-diketones, α-deprotonated-β-ketoesters, halogens and mixtures thereof. Among the preferred diimine complexes are those having a formula selected from the group consisting of Ni(NCR'C$_6$R$_2$H$_3$)$_2$(E$_2$C$_3$R"$_2$Q)$_2$ and Ni(NCR'C$_6$R$_2$H$_3$)$_2$(E$_2$C$_3$R"$_2$Q)X and Ni(NCR'C$_6$R$_2$H$_3$)$_2$X$_2$ and Pd(NCR'C$_6$R$_2$H$_3$)$_2$(E$_2$C$_3$R"$_2$Q)$_2$ and Pd(NCR'C$_6$R$_2$H$_3$)$_2$(E$_2$C$_3$R"$_2$)X and Pd(NCR'C$_6$R$_2$H$_3$)$_2$X$_2$ and mixtures thereof. The preferred diimine complexes are also represented by general structural formulas as shown below in Compounds I and II, wherein the Ni can be either can be nickel or palladium. As used throughout this specification, even though nickel, or Ni, is used, it is intended that palladium, or Pd, can be used in the same manner, applications and compounds.

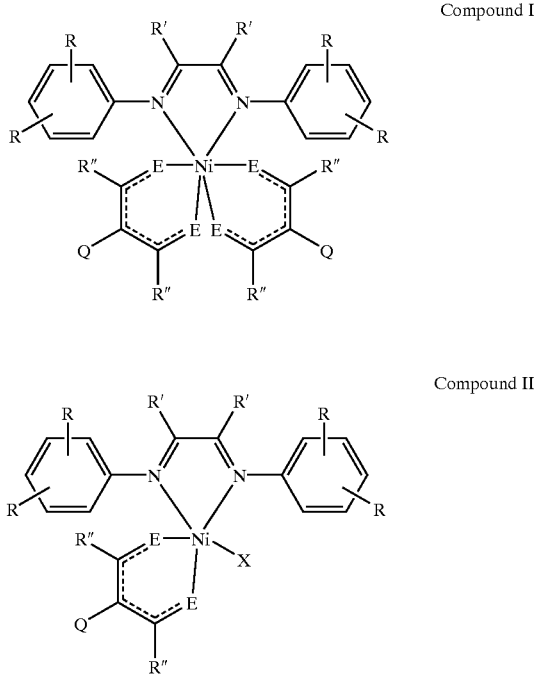

Compound I

Compound II wherein each R is independently selected from the group consisting of hydrogen, alkyl or aromatic groups, wherein said alkyl groups having from about 1 to about 10, preferably from about 1 to about 8, carbon atoms per alkyl group, and said alkyl groups may be branched or linear, preferably comprise phenyl and substituted phenyl groups, wherein said aromatic groups and the R substituents on the aromatic ring may be the same or different, and the R substituents can be in any position on the aromatic ring; and wherein each R' is independently selected from the group consisting of hydrogen and linear, branched, cyclic, bridging, aromatic, and/or aliphatic hydrocarbon radicals, having from about 1 to about 70, preferably from about 1 to about 20, carbon atoms per radical group and wherein the R' substituents on the aromatic ring can be the same or different; and wherein the R"CECQCER" substituents or ligands (also written as E$_2$C$_3$R"$_2$Q) on the diimine complex can be the same or different and are selected from the group consisting of α-deprotonated-β-diketones, α-deprotonated-β-ketoesters, halogens and mixtures thereof; and the group X, which is a halogen, of the diimine complex is selected from the group consisting of fluorine, chlorine, bromine and/or iodine. Preferably, the halogen is selected from the group consisting of chlorine and/or bromine for high catalyst activity and productivity. Most preferably, the halogen is chlorine for best catalyst system activity and productivity; and the E groups can be the same or different but are preferably the same, and each E group is independently selected from the group consisting of oxygen, sulfur and selenium.

In Compounds I and II shown above, the location of the "prime" on the left or right of "R" is marks stylistic and is not meant to indicate any difference; in other words, 'R has the same meaning set forth for R', and "R has the same meaning set forth for R".

The R"CECQCER" substituents or ligands, also written as E$_2$C$_3$R"$_2$Q, in which R" can be the same or different, on any one diimine nickel complex of the catalyst systems described herein, can be the same or different and are selected from the group consisting of α-deprotonated-β-diketones, α-deprotonated-β-ketoesters, halogens and mixtures thereof. The α-deprotonated-β-diketones and α-deprotonated-β-ketoesters can be derived from β-diketone and β-ketoester ligand precursors. Exemplary ligands precursors include, but are not limited to, compounds selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4-trifluoroacetoacetate, 1,1,1-trifluoro-5,5-dimethyl-2,4-pentanedione, ethyl α-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione. Preferably, ligand precursors are selected from the group consisting of 2,4-pentanedione, 1,1,1,5,5,5-hexafluoro-2,4-pentanedione, 1,1,1-trifluoro-2,4-pentanedione, 1-chloro-1,1-difluoroacetylacetone, methyltrifluoroacetoacetate, 1,1,1-trifluoro-5,5-dimethyl-2,4-pentanedione, and ethyl α-methyl-4,4,4-trifluoroacetoacetate. Most preferably, ligands include, but are not limited to 2,4-pentanedione, 1,1,1,5,5,5-hexafluoro-2,4-pentanedione, 1,1,1-trifluoro-2,4-pentanedione, 1-chloro-1,1-difluoroacetylacetone, and 1,1,1-trifluoro-5,5-dimethyl-2,4-pentanedione for best catalyst system activity as well as best polymer product properties.

R" and Q can be the same or different and are selected from the group consisting of hydrogen and linear, branched, cyclic, bridging, aromatic or aliphatic hydrocarbons and mixtures of any two or more of these radicals having from about 1 to about 70 carbon atoms per radical group.

Group X, i.e., halogen, of the diimine nickel complex is selected from the group consisting of fluorine, chlorine, bromine and/or iodine. Preferably, the halogen is selected from the group consisting of chlorine and/or bromine for high catalyst system activity and productivity. Most preferably, the halogen is chlorine for best catalyst system activity and productivity.

E is independently selected from the group consisting of oxygen, sulfur and selenium.

Alternately, the diimine nickel complexes can have a formula selected from the group consisting of Ni(CR'C$_6$R$_n$H$_{5-n}$)$_2$(E$_2$C$_3$R"$_2$Q)X; where R, R', E$_2$C$_3$R"$_2$Q and X have the meanings set forth above and n is an integer from 0 to 5. In those embodiments where diimine palladium (II) complexes are employed the palladium complexes can have a formula selected from the group consisting of $Pd(CR'C_6R_nH_{5-n})_2(E_2C_3R''_2Q)_2$ and $Pd(CR'C_6R_nH_{5-n})_2(E_2C_3R''_2Q)X$; preferably, the palladium complexes are selected from the group consisting of $Pd(NCR'C_6R_2H_3)_2(E_2C_3R''_2Q)_2$ and $Pd(NCR'C_6R_2H_3)_2(E_2C_3R''_2Q)X$, where R, R', $E_2C_3R''_2Q$, X, and n have the meanings set forth above.

The R substituents on the aromatic rings of any one of the diimine nickel complexes employed in the catalyst systems described herein can be the same or different, and are selected from the group consisting of branched or linear alkyl (aliphatic) or aromatic groups having from about 1 to about 10, preferably from about 1 to about 8, carbon atoms per alkyl group. Although hydrogen can be used, hydrogen can inhibit synthesis of the ligand. R groups having more than about 8 carbon atoms per group can result in a catalyst system with lower activity and/or productivity. While not wishing to be bound by theory, it is believed that larger R substituent groups can cause steric hindrance in the catalyst system, which can thereby decrease catalyst system activity and/o r productivity and/or ease of synthesis of the catalyst. Exemplary alkyl substituents are selected from the group consisting of methyl, ethyl, propyl, isopropyl, butyl, isobutyl, tert-butyl, benzyl, phenyl groups, and mixtures of two or more thereof. Preferably, the R substituent is an electron-donating species, selected from the group consisting of linear or branched aliphatic groups having from about 1 to about 5 carbon atoms per group. Preferably, the R groups on at least one diimine nickel complex are both the same and are selected from the group consisting of methyl and isopropyl, due to commercial availability and ease of synthesis of the ligand.

Preferably, in catalyst systems of the present invention which comprise at least two different diimine nickel complexes, the R groups on one, or a first, diimine nickel complex are both isopropyl, and the R groups on a different, or a second, diimine nickel complex are both methyl. This is especially preferred when the R' groups of both of those diimine nickel complexes are the same.

The R group on any one diimine nickel complex can be in any position, i.e., from 2 to 6, on the aromatic ring. Preferably, the R group, which can be the same or different from another R group in the same aromatic ring, is either in the 2 or 6 position, due to ease of synthesis. Most preferably, for best catalytic activity and productivity, both R groups are the same and are in the 2 and 6 positions on the aromatic ring.

The R' substituents of any one diimine nickel complex employed in the catalyst systems described herein can be the same or different and are selected from the group consisting of hydrogen and branched, linear, cyclic, aromatic or aliphatic radicals having from about 1 to about 70 carbon atoms per radical. Further, the R' substituents can be linked, or joined, across the carbon-carbon bridge between the two nitrogen atoms of the diimine. While not wishing to be bound by theory, it is believed that radicals having more than 70 carbon atoms can add to the steric hindrance of the catalyst systems and hinder catalyst synthesis and/or activity and productivity. Preferably, the R' substituent group is selected from the group consisting of hydrogen and branched, linear, cyclic, aromatic or aliphatic radicals having from about 1 to about 20 carbon atoms per radical, due to commercial availability and ease of synthesis of the ligand. Most preferably, the R' substituent groups are the same or a link across the carbon-carbon bridge between the nitrogen atoms, and the R' substituent is selected from the group consisting of hydrogen and branched, linear, cyclic, aromatic or aliphatic radicals having from about 1 to about 12 carbon atoms per radical, for the reasons given above. Exemplary R' substituents include, but are not limited to, hydrogen, methyl, ethyl, propyl, phenyl, taken together acenaphthyl or cyclobutadienyl.

Preferably, in catalyst systems of the present invention which comprise at least two different diimine complexes, the R' substituents on one diimine complex are both hydrogen and the R' substituents of a different diimine complex are both methyl. This is especially preferred when the R groups of both of those diimine complexes are the same, for example, where the R groups of both diimine complexes are both methyl or both isopropyl.

In some embodiments of the present invention that are currently preferred, a catalyst system comprises a first diimine nickel complex and a second diimine nickel complex, both of which comprise aromatic rings on the nitrogen atoms of the diimine groups. In the first diimine nickel complex, the R substituents are isopropyl groups in the 2 and 6 positions on both of the aromatic rings, and/or the R' substituents are both hydrogen. In the second diimine nickel complex, the R substituents are isopropyl groups in the 2 and 6 positions on one or both of the aromatic rings, and/or the R' substituents are methyl groups. In other currently preferred embodiments, the second diimine nickel complex is the same as described in the preceding sentence, but the first diimine nickel complex comprises R substituents that are both methyl groups in the 2 and 6 positions on both of the aromatic rings and R' substituents that are both methyl groups. In still other currently preferred embodiments, the first diimine nickel complex comprises one R substituent on each aromatic ring that is an isopropyl group in the 2 position and one R substituent that is hydrogen and R' substituents that are both methyl groups. The second diimine nickel complex is the same as described above.

The diimine nickel complexes and diimine palladium complexes disclosed herein can be prepared by any method known in the art. For example, approximate molar equivalents of a diimine ligand and a nickel compound can be contacted in the presence of any compound that can dissolve both the diimine ligand and nickel compound, either partially or completely. The contacting conditions can be any conditions suitable to effect the formation of a diimine nickel complex. Preferably, for best product results, the diimine ligand/nickel complex mixture is contacted at room temperature under a dry atmosphere for any amount of time sufficient to form the diimine nickel complex. Completion of the formation of the diimine nickel complex can be evidenced by a color change. Generally, contacting times of about 8 hours, and preferably 12 hours are sufficient. Usually, as a result of the preparation procedure, the resultant diimine nickel complex will comprise from about 3 to about 20, preferably from about 5 to about 15, weight percent nickel, based on the total mass of the diimine nickel complex. The presence of oxygen is not thought to be detrimental to this aspect of the preparation procedure.

In general, diimine ligands are contacted with a nickel β-diketonate or nickel β-diketonate halide to form diimine nickel complexes. Typical syntheses of nickel complexes related to those described herein can be found in Dieck, H., Svboda, M., and Greiser, T., *Z. Naturforsch B: Anorg. Chem. Organ. Chem.*, Vol. 36b, pp. 823–832 (1981), herein incorporated by reference. Usually, for ease of catalyst system preparation, the diimine ligand is prepared first. The catalyst preparation procedure can vary, depending on the substituents on the diimine ligand.

For example, to prepare a specific diimine ligand, wherein R' is hydrogen, a three-component mixture is prepared. A two-fold molar excess of aniline, containing the desired R substituents ($R_nC_6H_{(7-n)}N$, wherein n=1 or 2), is contacted with a dialdehyde, such as, for example, glyoxal (CHOCHO), in the presence of a compound capable of being a solvent for both organic and aqueous compounds. Exemplary solvents for both organic and aqueous compounds include, but are not limited to, methanol, ethanol and/or tetrahydrofuran (THF). The mixture can be contacted, preferably refluxed, under any atmosphere to form the desired ligand. Preferably, the mixture is refluxed for at least 10 minutes, preferably at least about 20 minutes, cooled and the desired ligand can be recovered. Generally, after refluxing and cooling, the ligand can be recovered in a crystalline form.

To prepare another specific diimine ligand wherein the R' group is anything other than hydrogen, a similar procedure can be used. For example, at least a two-fold molar excess of aniline or a substituted aniline can be combined with a compound capable of dissolving both organic and aqueous compounds and a very minor amount of formic acid. Then, about a one molar equivalent of an alpha-diketone (R' COCOR') can be added to the mixture. The mixture can be stirred under atmospheric conditions of temperature and pressure until the reaction is complete and the desired ligand is formed. Preferably, water is absent from the reaction mixture. Generally, the reaction will be complete in about 18 hours, preferably 24 hours. A crystalline ligand product can be recovered according to any method known in the art.

When it is desired to have a catalyst system comprising at least two different diimine nickel complexes that differ only with respect to the R' substituents, it can be possible to prepare those diimine nickel complexes simultaneously. A two-fold molar excess of aniline or a substituted aniline is combined with a compound capable of being a solvent for both organic and aqueous compounds and a very minor amount of formic acid. Then, the desired relative amounts of glyoxal and an alpha-diketone, which together comprise about a one molar equivalent, can be added to the mixture. The mixture can be stirred under atmospheric conditions of temperature and pressure until the reaction is complete and the desired ligand is formed. Preferably, water is absent from the reaction mixture. Generally, the reaction can be completed in about 18 hours, preferably 24 hours. A crystalline ligand product can be recovered according to any method known in the art. When it is desired to have a catalyst system comprising at least two different diimine nickel complexes that differ with respect to the R substituents, it is preferred, though not necessarily required, to prepare each of those diimine nickel complexes independently.

The nickel bis($\beta$-diketonate), nickel bis($\beta$-ketoester), nickel $\beta$-diketonate halide and nickel $\beta$-ketoester halide can be prepared by any method known in the art. Typical syntheses of such nickel complexes can be found in Bullen, G J., Mason, R., and Pauling, P., *Inorganic Chemistry, Vol. 4*, pp. 456–462 (1965), herein incorporated by reference. Alternatively, and especially in the case of nickel an diketonate halides and nickel $\beta$-ketoester halides, the salt of the $\beta$-diketone or $\beta$-ketoester can be prepared then reacted with the correct quantity of nickel halide. A mixture of an appropriate Brönsted base, such as but not limited to sodium or potassium hydride or sodium or potassium methoxide, is mixed with a solvent capable of dissolving or becoming miscible with the $\beta$-diketone or $\beta$-ketoester. Exemplary solvents include toluene, benzene, methanol, or ethanol. One molar equivalent of the $\beta$-diketone or $\beta$-ketoester is added slowly to this mixture.

Reaction is known to occur as evidenced by the evolution of heat and a change in the physical appearance of the mixture. Once all reactants have contacted, reaction times from 4 to 12 hours are sufficient to ensure complete reaction. If the product salt of the $\beta$-diketone or $\beta$-ketoester is not soluble in the solvent chosen, the solvent is removed by filtration or vacuum and the salt dissolved in a solvent in which it is soluble. Exemplary solvents include, but are not limited to, methanol, ethanol, and mixtures thereof. This solution then can be added to about a one half molar equivalent of nickel halide that has been suspended or dissolved in the same solvent or a solvent with which the first solvent is miscible. The preceding reactant ratio results in the formation of a nickel bis(O-diketonate) or nickel bis(p-ketoester). If the nickel $\beta$-diketonate halide or nickel $\beta$-ketoester halide are desired, the solution can be added to about a one molar equivalent of nickel halide, as described. Reaction is known to occur as evidenced by the formation of a soluble green species. Reaction times of 4 to 12 hours can be sufficient to ensure complete reaction. The byproduct sodium or potassium halide salt then is removed from the reaction product by filtration and/or centrifugation. The solvent can be removed by vacuum to yield the nickel complex used in a nickel diimine complex synthesis.

After formation of a diimine nickel complex, the diimine nickel complex can be recovered by any method known in the art, such as, for example, evaporation and/or vacuum filtration of the solvent. Further, if desired, the diimine nickel complex can be purified further by washing. One exemplary wash compound can be heptane. The diimine nickel complex catalyst can be recovered and used as a part of a catalyst system.

In the preparation and/or use of a catalyst system, the two diimine complexes can be added simultaneously or one at a time, and either of the diimine can be added first.

It is believed that these methods also be can employed to prepare diimine palladium complexes. Other methods of preparing diimine nickel complexes and diimine palladium complexes are set forth in U.S. Pat. No. 5,852,145, the entirety of which is herein incorporated by reference.

Reactants, Polymerization and Polymer Products

Polymers having multimodal molecular weight distributions (such as bimodal MWDs, trimodal MWDs, etc.) can be produced by employing a catalyst system comprising at least two different diimine nickel complexes, wherein at least one of those diimine nickel complexes is capable of producing polymer having a relatively higher molecular weight and at least one other diimine nickel complex is capable of producing polymer having a relatively lower molecular weight. In preferred embodiments of these polymers, the higher molecular weight polymer is relatively branched whereas the lower molecular weight polymer is relatively linear. Again, as stated earlier, palladium can be used in place of nickel to nickel in this application.

A "relatively higher molecular weight" polymer is a polymer or a portion of a polymer sample that has a molecular weight that is higher relative to the molecular weight of another polymer or another portion of a polymer sample. A "relatively lower molecular weight" polymer is a polymer or a portion of a polymer sample that has a molecular weight that is lower relative to the molecular weight of another polymer or another portion of a polymer sample. A "relatively branched" polymer is a polymer or a portion of a polymer sample that contains more branches or the polymer chain than another polymer or another portion of a polymer sample.

It is presently believed that the existence of larger substituents on the diimine portion of one diimine complex, as compared to the substituents on the diimine portion of another diimine complex in the same catalyst system, can be a factor in the production of bimodal or multimodal polymers, if not a predominant or primary factor. The larger substituents can be on the carbon bridge of the diimine or on some other group associated with the nitrogen atoms of the diimine. For example, a first diimine nickel complex in a catalyst system can have hydrogen substituents while a second diimine nickel complex in the same catalyst system can have methyl substituents, or a first diimine nickel complex may have at least one lower alkyl substituent while a second diimine nickel complex can have a higher alkyl substituent, or a first diimine nickel complex can have only one substituent at certain locations while the second diimine nickel complex can have two substituents at corresponding locations. In any case, the first diimine nickel complex will typically can have a lower molecular weight and/or a smaller ligand than the second diimine nickel complex. While not wishing to being bound by theory, it is presently believed that larger substituents on a diimine nickel complex can shield the nickel atom from monomer, and as a result, the nickel compound engages in "chain walking" or "chain transfer", thereby introducing a branch into the polymer chain and yielding a higher molecular weight polymer. Alternatively or additionally, it is presently thought that larger substituents can hinder or prevent rotation of substituents (such as phenyl) on the nitrogen atoms of the diimine portion of the nickel complex, thereby yielding a higher molecular weight polymer.

Regardless of the theory or mechanism of operation, it surprisingly has been found that polyethylene having a bimodal MWD can be produced by using a catalyst system comprising two different diimine nickel complexes which differ with respect to their R substituents and/or R' substituents. Thus, a polyethylene having a bimodal MWD can be produced by using a catalyst system comprising a first diimine complex and a second diimine complex, where the first diimine complex can have a lower molecular weight and/or smaller ligand(s) compared to the diimine second complex.

Polymers produced according to the process of this invention can be homopolymers of mono-I-olefins or copolymers of at least two different mono-1-olefins. Exemplary mono-1-olefins useful in the practice of this invention include, but are not limited to, mono-1-olefins having from about 2 to about 10 carbon atoms per molecule. Preferred mono-1-olefins include, but are not limited to, ethylene, propylene, 1-butene, 1-pentene, 1-hexene, 1-heptene, 3-methyl-1-butene, 4-methyl-1-pentene, 1-octene, 1-nonene and 1-decene. Ethylene is the most preferred mono-1-olefin for use with the catalyst systems described herein. Propylene is also a suitable mono-1-olefin for use with the present invention; polypropylene produced with diimine nickel complexes is highly syndiotactic. If the reaction product is a copolymer, one mono-1-olefin monomer can be polymerized with a mono-1-olefin comonomer which is a different alpha-olefin, usually having from about 3 to about 10, preferably from 3 to 8 carbon atoms per molecule. Exemplary comonomers include, but are not limited to, propylene, 1-butene, butadiene, 1-pentene, 1-hexene, 1-octene, 4-methyl-1-pentene, and mixtures thereof. Preferably, if the monomer is ethylene, the comonomer is 1-hexene and/or 4-methyl-1-pentene, in order to achieve maximum polymer product toughness. Preferably, if the monomer is propylene, the comonomer is ethylene and/or butadiene in order to achieve maximum polymer product toughness and clarity.

If a comonomer is used, the comonomer can be added to the polymerization reactor, or reaction zone, in an amount within a range of about 1 to about 20 weight percent, preferably within 7 to about 18 weight percent, based on the weight of the ethylene monomer. Most preferably, a comonomer is present in the reaction zone within a range of about 10 to about 16 weight percent, in order to produce a polymer having the most desired physical properties.

Polymerization of the monomer and optional comonomer can be carried out under slurry polymerization conditions, which also are known as loop/slurry or particle form polymerization conditions. Under such conditions, the temperature is kept below the temperature at which polymer swells significantly. Slurry polymerization processes are much easier to operate and maintain than other polymerization processes; a polymer product produced by a slurry process can be recovered much more easily. Such polymerization techniques are well-known in the art and are disclosed, for instance, in Norwood, U.S. Pat. No. 3,248,179, the disclosure of which is hereby incorporated by reference.

A slurry process generally is carried out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product. Exemplary diluents include, but are not limited to, propane, n-butane, isobutane, n-pentane, 2-methylbutane (isopentane), and mixtures thereof. Isobutane is the most preferred diluent due to low cost and ease of use.

The temperature of the polymerization reactor, or reaction zone, when using isobutane as the reactor diluent, according to this invention, is critical and must be kept within a range of about 5° C. to about 100° C. (41° F.–212° F.) and preferably within a range of about 10° C. to about 70° C. (50° F.–158° F.). Most preferably, the reaction zone temperature is within a range of 200 to 60° C (680–140° F.) for best catalyst activity and productivity. Reaction temperatures below about 5° C. can be ineffective for polymerization.

Pressures in the slurry process can vary from about 100 to about 1000 psia (0.76–7.6 MPa), preferably from about 200 to about 700 psia. Most preferably, the reaction zone is maintained at a pressure within a range of 300 to 600 psia for best reactor operating parameters and best resultant polymer product. The catalyst system is kept in suspension and is contacted with the monomer and comonomer(s) at sufficient pressure to maintain the medium and at least a portion of the monomer and comonomer(s) in the liquid phase. The medium and temperature are thus selected such that the polymer or copolymer is produced as solid particles and is recovered in that form. Catalyst system concentrations in the reactor can be such that the catalyst system content ranges from 0.001 to about 1 weight percent based on the weight of the reactor contents.

Catalyst systems and cocatalyst, for example, methylaluminoxane (MAO), can be added to the reactor in any order to effect polymerization. For example, one or both of the nickel catalysts can be added, then some reactor diluent, such as isobutane, followed by MAO, then more diluent and finally, monomer and optional comonomer. However, as stated earlier, this addition order can be varied, depending on equipment availability and/or desired polymer product properties. Preferably, nickel catalyst systems are not precontacted with MAO prior to addition to the polymerization reactor due to a possible decrease in catalyst activity.

The amount of catalysts and cocatalysts added to the reactor can vary. Generally, when MAO is used, a molar excess of MAO is present, relative to the nickel compounds, especially relative to a diimine nickel complex. Preferably, the aluminum to nickel (Al:Ni) molar ratio is less than about 1500:1, more preferably within a range of about 50:1 to about 600:1. Most preferably, the molar ratio of aluminum to nickel is within a ratio of 100:1 to 400:1 for best catalyst system activity and productivity.

Cocatalysts other than MAO also can be used. Illustrative examples include, but are not limited to, other alkyl aluminoxy compounds such as ethylaluminoxane, alkyl aluminum compounds such as trimethyl aluminum, alkyl aluminum halide compounds such as diethyl aluminum chloride, alkyl zinc compounds such as diethyl zinc, alkyl zinc halide compounds, aluminum or zinc halogen compounds, alkyl boron compounds and mixtures thereof.

Other compounds that do not interfere with the results desired also may be included in the catalyst system. In particular, it has been found advantageous in some circumstances to include aluminophosphate in the catalyst system. Indeed, it has been found that the addition of an aluminophosphate to a catalyst system comprising a diimine nickel complex and a metal alkyl cocatalyst may render that catalyst system active or more active.

Two preferred polymerization methods for the slurry process are those employing a loop reactor of the type disclosed in the aforementioned Norwood patent and those utilizing a plurality of stirred reactors either in series, parallel or combinations thereof wherein the reaction conditions can be the same or different in the different reactors. For instance, in a series of reactors, a chromium catalyst system which has not been subjected to the reduction step can be utilized either before or after the reactor utilizing the catalyst system of this invention.

Polymerization processes using diimine nickel complexes generally have reduced cocatalyst consumption and tend to use cocatalysts, such as MAO, efficiently and productively.

Polymers produced by using single diimine nickel complexes generally have a relatively narrow heterogeneity index (HI), which is a ratio of the weight average molecular weight ($M_w$) to the number average molecular weight ($M_n$) (also expressed as $M_w/M_n$). However, polymers produced by using a catalyst system comprising two different diimine nickel complexes usually have a relatively wider, or higher, heterogeneity index.

Polymers produced by using a single diimine nickel complex are very unique because of a significant amount of short chain branching which can be produced even in the absence of a comonomer added to the reactor. This short chain branching is evidence that some sort of comonomer(s) are produced in-situ in the reactor and are incorporated into the polymer and/or that the catalyst system can form short chain branches by rearrangement of the main polymer chain through successive hydride elimination, olefin rotation, and hydride re-addition reactions.

This series of steps may or may not involve discrete intermediates and may rather be a concerted or continuous series of reactions with no distinct intermediates formed. Such rearrangements can be termed "chain walking". Chain walking can be described by the active metal catalyst, i.e. nickel, "walking" a distance along the polymer backbone during polymerization and hence, the short chain branch length can be dictated by the rate of ethylene insertion relative to the combined rates of hydride elimination, olefin rotation, and hydride re-addition. Usually, polymers produced using a diimine nickel complex, wherein no comonomer is added to the polymerization reactor, comprise up to about 3000, and generally from about 20 to about 3000 short chain branches per 10,000 (or from about 2 to about 300 short chain branches per 1000) backbone carbon atoms of the polymer. Furthermore, the short chain branches produced comprise both odd and even carbon branches, i.e., branches comprising an odd number of carbon atoms per short chain branch, as well as branches comprising an even number of carbon atoms per short chain branch.

As discussed above, in catalyst systems described herein, it has been found that a first diimine nickel complex can provide relatively lower molecular weight polyolefins, while a second diimine nickel complex of the same catalyst system can provide substantially higher molecular weight polyolefins. It has also been found that, in at least some embodiments of such catalyst systems, a first diimine nickel complex can tend to provide a polyolefin that is substantially linear, while the second diimine nickel complex of the same catalyst system can tend to provide a substantially branched polyolefin, or at least a polyolefin that is not insubstantially branched. It is within the scope of the present invention to provide a polymer composition having a molecular weight distribution that comprises an upper mode in which some or most of the polymer is substantially branched or at least not insubstantially branched, and some or most of the polymer within the lower mode is substantially linear. Again, while not wishing to being bound by theory, it is presently believed that larger substituents on the second diimine nickel complex may shield the nickel atom from monomer, thereby encouraging or facilitating the second diimine nickel complex to engage in chain walking, while the relatively more accessible nickel atom of the first diimine nickel complex (which produces lower molecular weight polyolefin) does not engage in chain walking.

Although the catalyst systems of the present invention are mostly described herein as having two diimine nickel catalysts, these catalysts systems may have three, four or more diimine nickel (II) complexes or diimine palladium (II) complexes. Such catalyst systems, when employed in olefin polymerization processes, generally can yield multimodal polyolefins. The number of modes in the molecular weight distribution of a polyolefin can, but does not have to, correspond to the number of different diimine catalysts present in the catalyst system used to make that polyolefin product.

If desired, optional addition of one or more comonomers can be added to the polymerization reactor. The affirmatively added comonomers can further increase the amount of short chain branching in the resultant polymer or copolymer. Polymers produced with the addition of a comonomer can have a greater number of short chain branches in addition to those generated, as described above. If a comonomer is affirmatively added to the polymerization reactor, these polymers usually can comprise up to about 3500, and generally from about 20 to about 3500, short chain branches per 10,000 backbone carbon atoms of polymer.

A further understanding of the invention and its advantages is provided by the following examples.

EXAMPLES

The following Examples illustrate various aspects of the invention. Data about polymerization conditions and the nature of the resultant polymers are provided below. All chemical handling, including reactions, preparation and storage, was performed under a dry, inert atmosphere (usually nitrogen). Unless otherwise indicated, bench scale polymerizations were completed in a 2.6 liter autoclave reactor at the desired temperature using an isobutane (1.2 liter) slurry. The reactor was heated to 120° C. and purged with nitrogen for about 20 minutes. The reactor then was cooled to the desired polymerization temperature and pressurized with isobutane to about 400 psig. A catalyst system comprising known quantities (masses) of two different diimine nickel complexes was charged to the reactor against a countercurrent of isobutane and the agitator was set at 490 rpm. In Example 2, a known quantity of a single diimine nickel complex catalyst was used. If hydrogen was charged to the reactor, hydrogen addition was followed by isobutane, methylaluminoxane (MAO) was employed as a cocatalyst in each of the examples, and, where indicated in the Tables, trimethylaluminum (TMA) was also employed. The desired quantity of methylaluminoxane (and TMA, when it was used) was charged directly to the reactor via syringe. The polymerization runs were performed at 40° C. in isobutane, unless otherwise indicated. Ethylene was fed on demand and the polymerization reaction terminated when ethylene flow into the reactor ceased.

The and names for the diimine nickel (II) complexes used in the examples are:

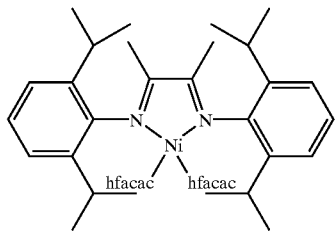

Structure A
N,N'-bis(2,6-diisopropylphenyl)-2,3-butanediimine bis(1,1,1,5,5,5,-hexafluoro-2,4-pentanedionate) nickel (II)

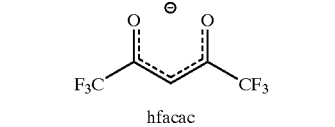

hfacac
1,1,1,5,5,5,-hexafluoro-2,4-pentanedionate

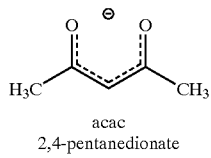

acac
2,4-pentanedionate

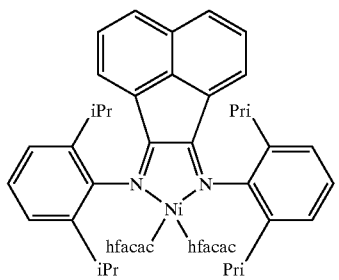

Structure B
N,N'-bis(2,6-diisopropylphenyl)acenaphthylenediimine bis(1,1,1,5,5,5,-hexafluoro-2,4-pentanedionate) nickel (II)

-continued

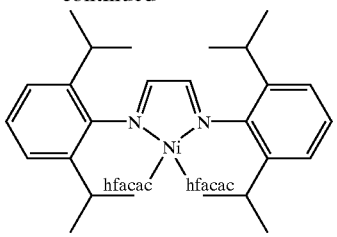

Structure C
N,N'-bis(2,6-diisopropylphenyl)ethylenediimine bis(1,1,1,5,5,5,-hexafluoro-2,4-pentanedionate) nickel (II)

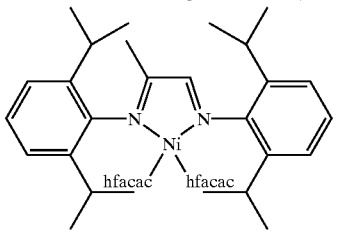

Structure D
N,N'-bis(2,6-diisopropylphenyl)-1,2-propanediimine bis(1,1,1,5,5,5,-hexafluoro-2,4-pentanedionate) nickel (II)

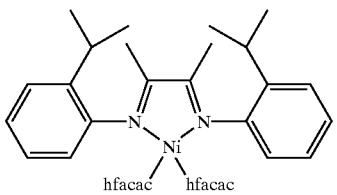

Structure E
N,N'-bis(2,6-isopropylphenyl)-2,3-butanediimine bis(1,1,1,5,5,5,-hexafluoro-2,4-pentanedionate) nickel (II)

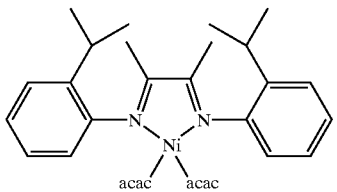

Structure F
N,N'-bis(2-isopropylphenyl)-2,3-butanediimine bis(2,4-pentanedionate) nickel (II)

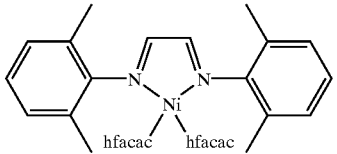

Structure G
N,N'-bis(2,6-dimethylphenyl)ethylenediimine bis(1,1,1,5,5,5-hexafluoro-2,4-pentanedionate) nickel (II)

Within the runs of Example 1 below, catalyst systems C, G and F were employed as the nickel compound of the catalyst system that provides relatively lower molecular weight polyolefins, while catalyst systems A, B and D employed as the nickel compound of the catalyst system that provided relatively higher molecular weight polyolefins. In general, catalyst systems used for polymerization in the Examples were prepared as described herein.

The columns in Tables 1 and 2 give the following information. Catalyst is the abbreviation of the diimine nickel complexes used in each Run. Mass Catalyst (grams) is the mass of each diimine nickel complex in the catalyst system charged to the polymerization reactor for each Run. Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 mins) was determined in accordance with ASTM D1238 at 190° C. with a 21,600 gram weight. Melt index (MI, g/10 mins) was determined in accordance with ASTM D1238 at 190° C. with a 2,160 gram weight. Size exclusion chromatography (SEC) analyses were performed at 140° C. on a Waters, model 150 GPC with a refractive index detector. A solution concentration of 0.17 to 0.65 weight percent in 1,2,4-trichlorobenzene was found to give reasonable elution times. Reported weight average molecular weight ($M_w$) and number average molecular weight ($M_n$) values (results) need to be multiplied by a factor of 1000 for the actual value. Reported Al:Ni ratio values are expressed as molar ratio values. Values that were not determined are represented as "ND" in the Tables.

Example 1

This example shows that polyethylene having a bimodal MWD can be made using a catalyst system comprising two different diimine nickel complexes.

Polymerizations in the following Runs were carried out as described above, with a reactor pressure of 550 psig ethylene in isobutane slurry at 400° C. In each run, a 10 mL aliquot of MAO was added as a 10% wt/wt solution in toluene. Polymerization results are listed below in Table 1.

polyethylene. Runs 102 and 103, and 105 and 106, respectively, demonstrate how changing the loadings, or amounts, of the two catalyst systems can change the polymer properties.

Regardless of the specific contribution of each of the two diimine nickel complexes in Runs 101–107, each Run demonstrates that a catalyst system comprising two different diimine nickel complexes can yield a polyolefin having a multimodal MWD. The runs show that differences in R substituents and/or R' substituents that may have seemed minor or inconsequential prior to the present invention, may in fact be significant factors in a catalyst system for producing polymers having a multimodal molecular weight distribution.

Figure 2:
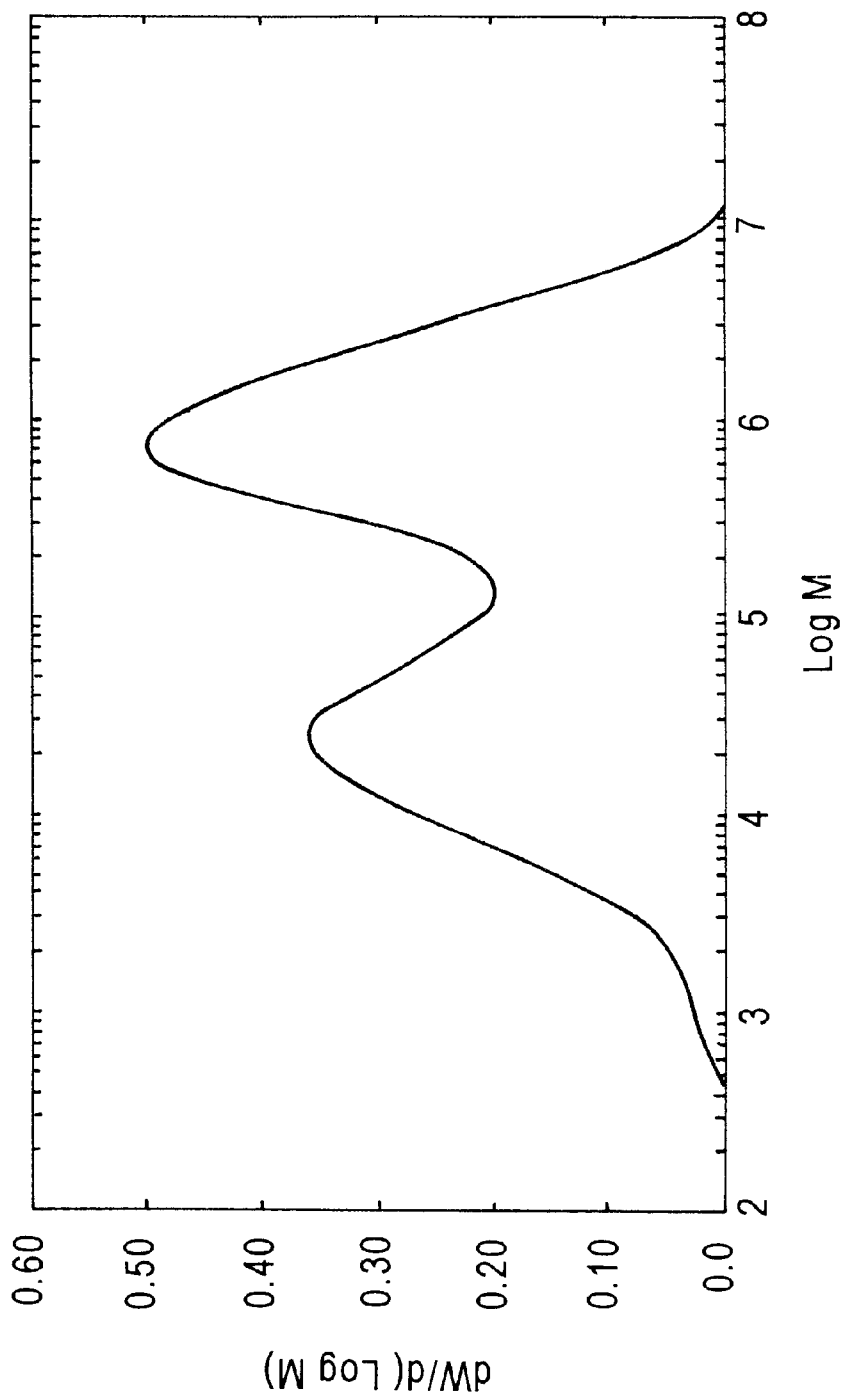
FIG. 2 is a size exclusion chromatography curve for a polyethylene sample made in an olefin polymerization process using a catalyst system comprising N,N'-bis(2,6-dimethylphenyl)-1,2-ethylenediimine nickel (II) bis (hexafluoroacetylacetonate) and N,N'-bis(2,6-diisopropylphenyl)-2,3-butanediimine nickel (II) bis (hexafluoroacetylacetonate) as catalysts and methylaluminoxane as co-catalyst.
Figure 5:
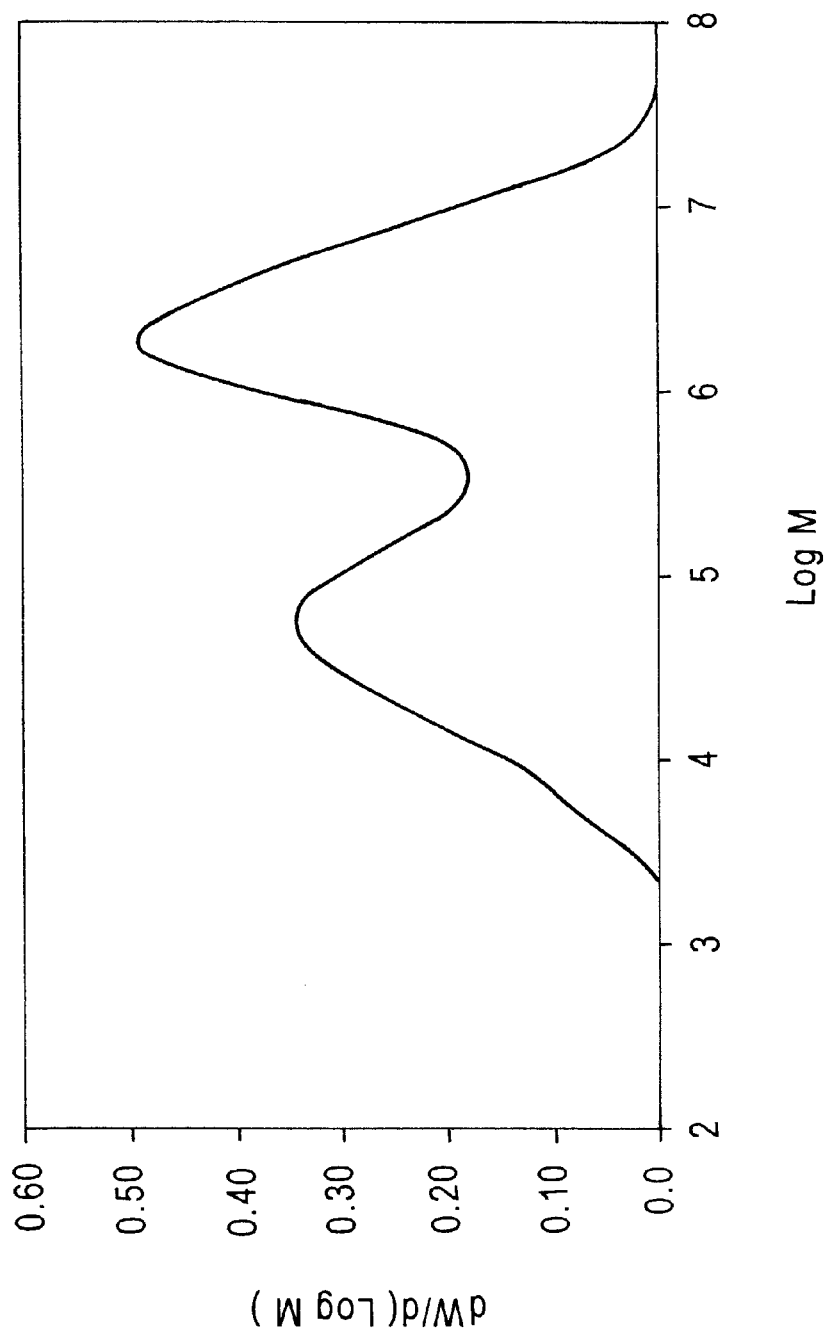
FIG. 5 is a size exclusion chromatography curve for a polyethylene sample made in an olefin polymerization process using a catalyst system comprising N,N'-bis(2,6-dimethylphenyl) ethylene diimine nickel (II) bis (hexafluoroacetylacetonate) and N,N'-bis(2,6-diisopropylphenyl)-2,3-butanediimine nickel (II) bis (hexafluoroacetylacetonate) as catalysts and methylaluminoxane as co-catalyst.

FIG. 1 shows the molecular weight distribution of the polymer made in Run 101. FIG. 2 shows the molecular weight distribution of the polymer made in Run 102. FIG. 5 shows the molecular weight distribution of the polymer made in Run 103. The data in Table 1 and FIGS. 1—2 and 5 show that catalyst systems comprising two different diimine nickel(II) catalysts effectively can polymerize ethylene to form polyethylene having a bimodal molecular weight distribution.

More particularly, FIG. 1 is a size exclusion chromatography curve for a polyethylene sample made in Run 101. In the curve of FIG. 1, the left mode or peak (i.e., the peak corresponding to lower molecular weight polyethylene) is attributed to a polymer made mostly by catalytic activity of N,N'-bis(2,6-diisopropylphenyl)-1,2-ethylenediimine nickel (II) bis(hexafluoroacetylacetonate) as a polymerization catalyst, while the right mode or peak (i.e., the peak corresponding to higher molecular weight polyethylene) is attrib-

TABLE 1

(all Runs were at 40° C.)

| Run # | Catalyst/ Mass (g) | Catalyst/ Mass (g) | MAO (mL) | Productivity (g PE/g Ni Catalysts) | MI | HLMI | Density (g/cc) | Mn | Mw | HI |
|---|---|---|---|---|---|---|---|---|---|---|
| 101 | A 0.0040 | C 0.0141 | 10 | 8550 | 0 | 0.06 | 0.9166 | 21.7 | 418 | 19.3 |
| 102 | A 0.0038 | G 0.0034 | 10 | 15672 | 0 | 0 | 0.9365 | 21.3 | 764 | 35.8 |
| 103 | A 0.0038 | G 0.0085 | 10 | 13415 | 0 | 0.04 | 0.9251 | 54 | 2073 | 38.2 |
| 104 | A 0.0059 | F 0.012 | 10 | 5795 | 0 | 0.3 | 0.9337 | 5.85 | 2224 | 380 |
| 105 | B 0.0046 | F 0.0053 | 5 | 19615 | 0 | 22.2 | 0.9591 | 4.67 | 489 | 105 |
| 106 | B 0.0058 | F 0.0055 | 10 | 4432 | 0 | 32.6 | 0.9579 | 4.42 | 211 | 48 |
| 107 | D 0.0047 | F 0.0056 | 5 | 996 | 1.1 | high | 0.9241 | 2.68 | 124 | 46.5 |

In each of these runs; the first diimine nickel complex (i.e., catalysts C, G and F) has a lower molecular weight and a smaller ligand than the second diimine nickel complex (i.e., catalysts A, B and D). The lower molecular weight and smaller ligand are attributed to differences in the diimine portion of the complex rather than to other ligands. It is believed that the first diimine nickel complex in each run catalyzed the polymerization of relatively lower molecular weight polyethylene, although it may also contribute to some extent to relatively higher molecular weight polyethylene. Similarly, it is believed that the second diimine nickel complex catalyzed the polymerization of relatively higher molecular weight polyethylene, although it also can contribute to some extent to relatively lower molecular weight uted to a polymer made mostly by catalytic activity of N,N'-bis(2,6-diisopropylphenyl)-2,3-butanediimine nickel (II) bis(hexafluoroacetylacetonate).

FIG. 2 is a size exclusion chromatography curve for a polyethylene sample made in Run 102. In the curve of FIG. 2, the left mode or peak (i.e., the peak corresponding to lower molecular weight polyethylene) is attributed to a polymer made mostly by catalytic activity of N,N'-bis(2,6-dimethylphenyl)-1,2-ethylenediimine nickel (II) bis (hexafluoroacetylacetonate) as a polymerization catalyst, while the right mode or peak (i.e., the peak corresponding to higher molecular weight polyethylene) is attributed to a polymer made mostly by catalytic activity of N,N'-bis(2,6-diisopropylphenyl)-2,3-butanediimine nickel (II) bis (hexafluoroacetylacetonate).

FIG. 5 is a size exclusion chromatography curve for a polyethylene sample made in Run 103. In the curve of FIG. 5, the left mode or peak (i.e., the peak corresponding to lower molecular weight polyethylene) is attributed to a polymer made mostly by catalytic activity of N,N'-bis(2,6-dimethylphenyl)-1,2-ethylenediimine nickel (II) bis(hexafluoroacetylacetonate) as a polymerization catalyst, while the right mode or peak (i.e., the peak corresponding to higher molecular weight polyethylene) is attributed to a polymer made mostly by catalytic activity of N,N'-bis(2,6-diisopropylphenyl)-2,3-butanediimine nickel (II) bis(hexafluoroacetylacetonate).

Example 2

This example provides comparative runs using catalyst systems comprising a single diimine nickel complex containing β-diketonate ligands. This example shows that such catalyst systems give relatively narrow molecular weight polymers that are either (i) low molecular weight and substantially linear, or (ii) high molecular weight and substantially branched. Catalysts A, B, and D are shown to give relatively high molecular weight, substantially highly branched polymers, and catalysts C, E, F, and G are shown to give relatively low molecular weight, substantially linear polymers.

substantially branched polymer, meaning there is more than an insubstantial amount of branching.

Example 3

This example shows catalyst systems comprising two different diimine nickel complexes can be activated with a commercial supported MAO so that they will polymerize ethylene to make a polyolefin having a bimodal MWD. The diimine nickel complexes were chosen such that a first complex produced a relatively low molecular weight, substantially linear polymer, while a second complex produced a relatively high molecular weight, substantially branched polymer.

TABLE 2

(all Runs were at 40° C. with 5 mL of 1.8 MAO in Toluene)

| Run # | Catalyst Mass (g) | Productivity (g PE/g Ni Catalysts) | MI (g/10 min) | HLMI (g/10 min) | Density (g/cc) | Mn | Mw | HI |
|---|---|---|---|---|---|---|---|---|
| 201 | A 0.0195 | 7200 | 0 | 0 | 0.8926 | 706 | 1824 | 2.6 |
| 202 | B 0.0053 | 16000 | 0 | 0 | 0.8960 | 334 | 1522 | 4.6 |
| 203 | D 0.0060 | 6900 | 0 | 0.027 | 0.9364 | 318 | 1162 | 3.66 |
| 204 | C 0.0044 | 20000 | 0.26 | 14.75 | 0.9470 | ND | ND | ND |
| 205 | E 0.0144 | 17400 | High | High | 0.9647 | ND | ND | ND |
| 206 | F 0.0144 | 7000 | High | High | 0.9546 | ND | ND | ND |
| 207 | O 0.005 | 7000 | 0.62 | 41 | 0.9647 | ND | ND | ND |

In the present context, it is believed that a higher density indicates substantially linear polymer, or a polymer with insubstantial branching, while a lower density indicates

TABLE 3

| Run # | Catalyst Mass (g) | Catalyst Mass (g) | Supported MAO(g) | Temp. (° C.) | TMA (mL) | Productivity (g PE/g Ni Catalysts) | MI (g/10 min) | HLMI (g/10 min) | Density (g/cc) | Mn | Mw | HI |
|---|---|---|---|---|---|---|---|---|---|---|---|---|
| 301 | A 0.0060 | E 0.0060 | 0.29 | 60 | 0.5 | 800 | | | 0.9187 | 14.3 | 1076 | 75 |
| 302 | A 0.0043 | F 0.0076 | 0.30 | 60 | 0.5 | 800 | | | 0.9293 | 18.4 | 104 | 56 |
| 303 | A 0.0035 | E 0.0045 | 0.26 | 40 | 0.5 | 1800 | 0 | 0 | 0.9368 | 20.6 | 1681 | 82 |
| 304 | A 0.0033 | F 0.0092 | 0.26 | 40 | 0.5 | 700 | 002 | 96 | 0.9583 | 11 | 1206 | 110 |

Figure 3:
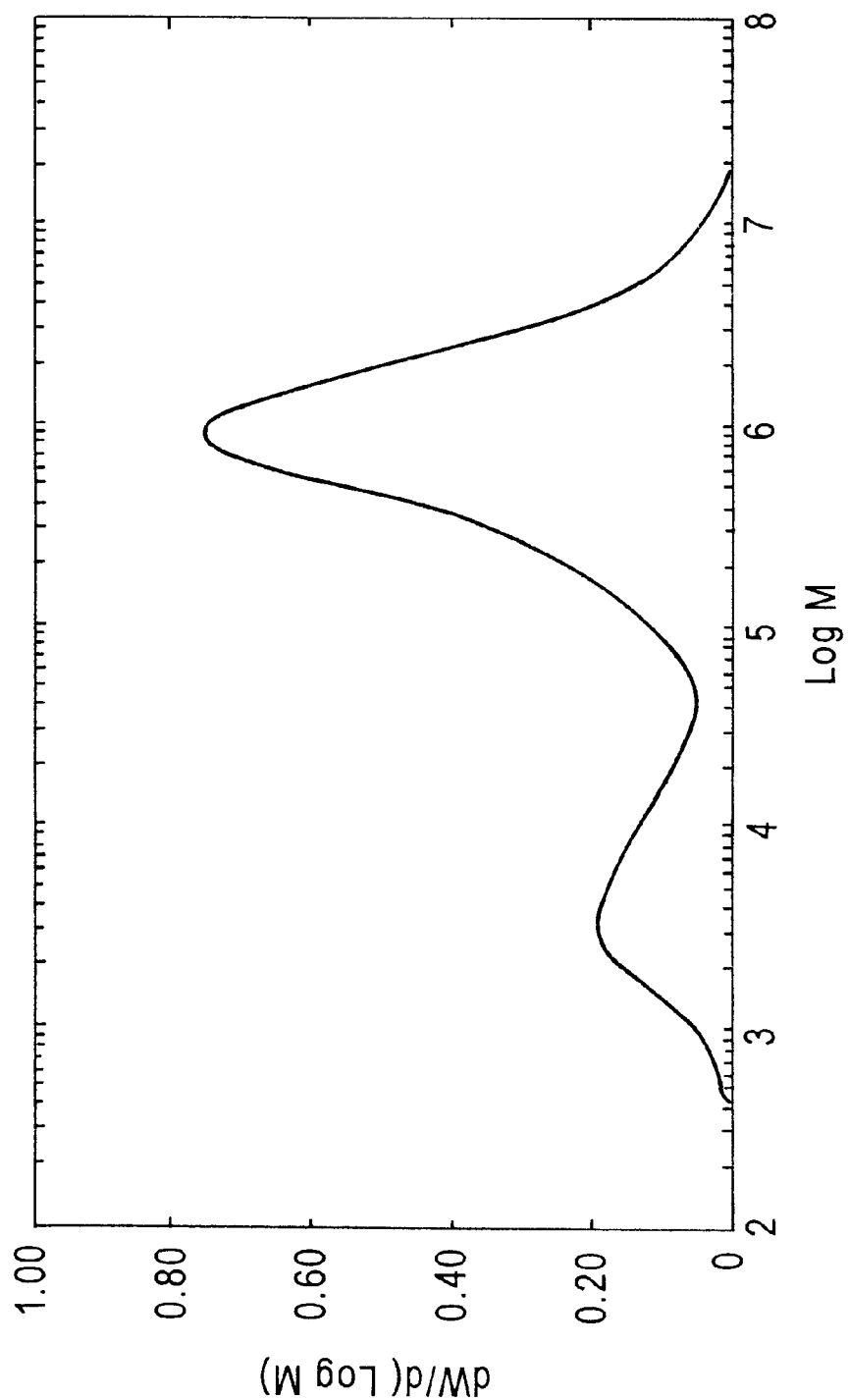
FIG. 3 is a size exclusion chromatography curve for a polyethylene sample made in an olefin polymerization process using a catalyst system comprising N,N'-bis(2-isopropylphenyl)-2,3-butanediimine nickel (II) bis (hexafluoroacetylacetonate) and N,N'-bis(2,6-diisopropylphenyl)-2,3-butanediimine nickel (II) bis (hexafluoroacetylacetonate) as catalysts and methylaluminoxane as co-catalyst.
Figure 4:
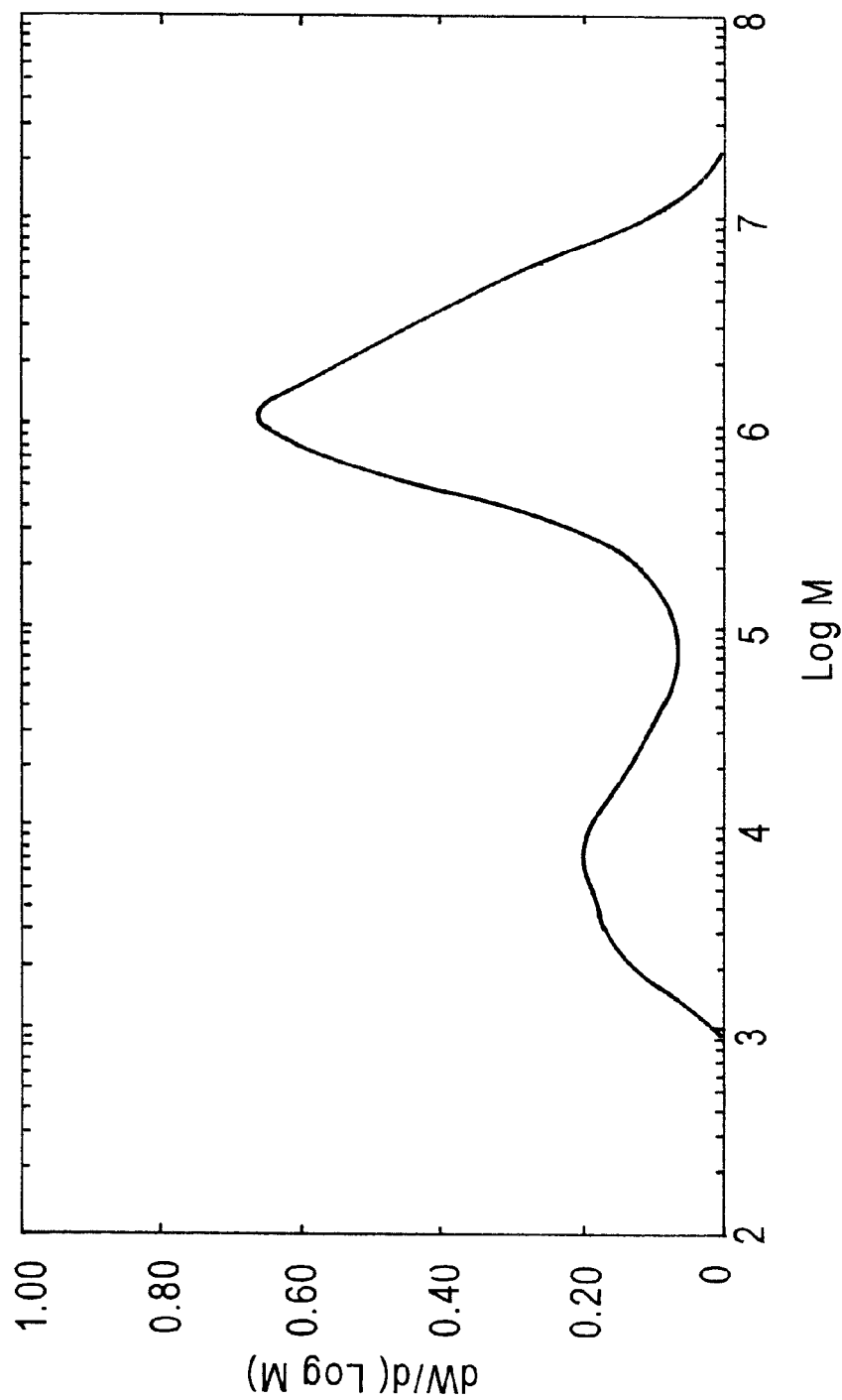
FIG. 4 is a size exclusion chromatography curve for a polyethylene sample made in an olefin polymerization process using a catalyst system comprising N,N'-bis(2-isopropylphenyl)-2,3-butanediimine nickel (II) bis (hexafluoroacetylacetonate) and N,N'-bis(2,6-diisopropylphenyl)-2,3-butanediimine nickel (II) bis (hexafluoroacetylacetonate) as catalysts and methylaluminoxane as cocatalyst.
Figure 6:
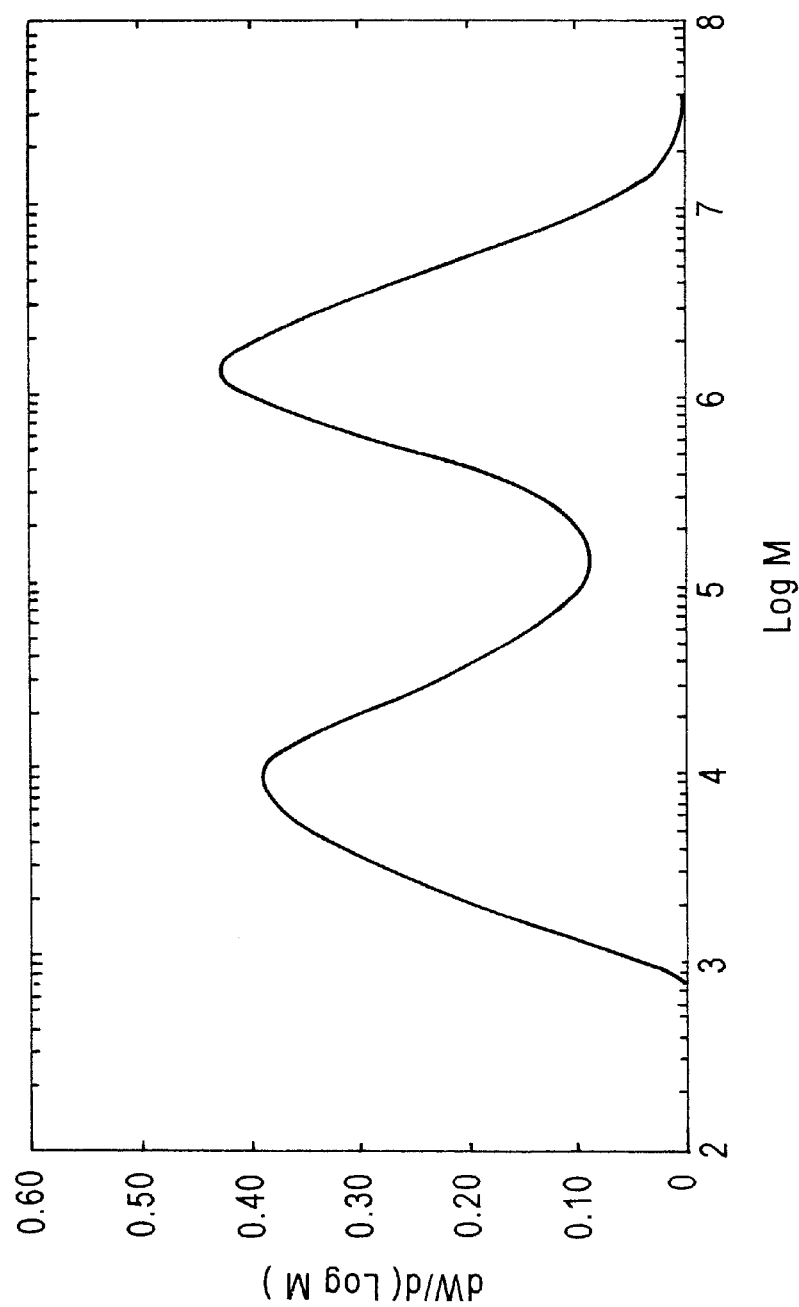
FIG. 6 is a size exclusion chromatography curve for a polyethylene sample made in an olefin polymerization process using a catalyst system comprising N,N'-bis(2-isopropylphenyl)-2,3-butanediimine nickel (II) bis(2,4-acetylacetonate) and N,N'-bis(2,6-diisopropylphenyl)-2,3-butanediimine nickel (II) bis(hexafluoroacetylacetonate) as catalysts and methylaluminoxane as co-catalyst.

FIG. 3 shows the molecular weight distribution of the polymer made in Run 301. FIG. 4 shows the molecular weight distribution of the polymer made in Run 303. FIG. 6 shows the molecular weight distribution of the polymer made in Run 304.

FIGS. 3 and 4 are size exclusion chromatography (SEC) curves for polyethylene sample made in Runs 301 and 303, respectively. In the curves of FIGS. 3 and 4, the left mode or peak (i.e., the peak corresponding to lower molecular weight polyethylene) is attributed to a polymer made mostly by catalytic activity of N,N'-bis(2-isopropylphenyl)-2,3-butanediimine nickel (II) bis(hexafluoroacetylacetonate) as a polymerization catalyst, while the right mode or peak (i.e., the peak corresponding to higher molecular weight polyethylene) is attributed to a polymer made mostly by catalytic activity of N,N'-bis(2,6-diisopropylphenyl)-2,3-butanediimine nickel (II) bis(hexafluoroacetylacetonate). FIG. 6 is a size exclusion chromatography curve for a polyethylene sample made in Run 304. In the curve of FIG. 6, the left mode or peak (i.e., the peak corresponding to lower molecular weight polyethylene) is attributed to the polymer made mostly by the catalytic activity of N,N'-bis (2-diisopropylphenyl)-2,3-butanediimine nickel (II) bis (hexafluoroacetylacetonate) as a polymerization catalyst, while the right mode or peak (i.e., the peak corresponding to higher molecular weight polyethylene) is attributed to the polymer made mostly by the catalytic activity of N,N'-bis (2,6-diisopropylphenyl)-2,3-butanediimine nickel (II) bis (hexafluoroacetylacetonate).

In each of FIGS. 1 through 6, the left mode shows the presence of polymer having a relatively lower molecular weight, relative to the polymer that corresponds to the right mode. The right mode shows the presence of polymer having a relatively higher molecular weight, relative to the polymer that corresponds to the left mode.

The diimine nickel complexes set forth in these Examples are not the only ones that may be used in the catalyst systems and processes of the present invention. Additional diimine palladium complexes and diimine nickel complexes (and abbreviations of same) that can be useful include, but are not limited to, wherein, again, palladium can be substituted for nickel in each of the following complexes,

[(iPr$_2$Ph)$_2$DABMe$_2$]Ni(acac)$_2$-N,N'-bis(2,6-diisopropylphenyl)-2,3-butanediimine nickel(II) bis (acetylacetonate);

[(iPr$_2$Ph)$_2$DABMe$_2$]Ni(hfacac)Cl-N,N'-bis(2,6-diisopropylphenyl)-2,3-butanediimine nickel(II) (1,1,1,5,5,5-hexafluoroacetylacetonate)chloride;

[(iPr$_2$Ph)$_2$DABMe$_2$]Ni(allOacac)$_2$-N,N'-bis(2,6-diisopropylphenyl)-2,3-butanediimine bis (allylacetylacetonato) nickel(II);

[(iPr$_2$Ph)$_2$DABMe$_2$]Ni(Phacac)$_2$-N,N'-bis(2,6-diisopropylphenyl)-2,3-butanediimine nickel(II) bis (benzoylacetonate);

[(iPr$_2$Ph)$_2$DABMe$_2$]Ni(PhCF$_3$acac)$_2$-N,N'-bis(2,6-diisopropylphenyl)-2,3-butanediimine nickel(II) bis (benzoyl-1,1,1-trifluoroacetonate);

[(iPr$_2$Ph)$_2$DABMe$_2$]Ni(CF$_3$acac)$_2$-N,N'-bis(2,6-diisopropylphenyl)-2,3-butanediimine nickel(II) bis( 1,1,1-trifluoroacetylacetonate);

[(iPr$_2$Ph)$_2$DABMe$_2$]Ni(CClF$_2$acac)$_2$-N,N'-bis(2,6-diisopropylphenyl)-2,3-butanediimine nickel(II) bis(1-chloro-1,1-difluoroacetylacetonate);

[(iPr$_2$Ph)$_2$DABMe$_2$]Ni(CF$_3$MeOacac)$_2$-N,N'-bis(2,6-diisopropylphenyl)-2,3-butanediimine bis (methyltrifluoroacetoacetato) nickel(II);

[(iPr$_2$Ph)$_2$DABMe$_2$]Ni(CF$_3$tBuacac)$_2$-N,N'-bis(2,6-diisopropylphenyl)-2,3-butanediimine nickel(II) bis(1,1,1-trifluoro-5,5-dimethylacetylacetonate);

[(iPr$_2$Ph)$_2$DABMe$_2$]Ni(CF$_3$OEt-?-Meacac)$_2$- N,N'-bis(2,6-diisopropylphenyl)-2,3-butanediimine bis(ethyl ?-methyl-4,4,4-trifluoroacetoacetato) nickel(II);

[(iPr$_2$Ph)$_2$DABMe$_2$]Ni(CF$_3$furacac)$_2$-N,N'-bis(2,6-diisopropylphenyl)-2,3-butanediimine nickel(II) bis(4,4,4-trifluoro-1-(2-furyl)acetylacetonate);

[(iPr$_2$Ph)$_2$DABMe$_2$]Ni(CF$_3$CF$_2$CF$_2$tBuacac)$_2$-N,N'-bis(2,6-diisopropylphenyl)-2,3-butanediimine nickel(II) bis(2,2-dimethyl-6,6,7,7,8,8,8-heptafluoro-3,5-octanedionate);

[(iPr$_2$Ph)$_2$DABAn]Ni(hfacac)$_2$-N,N'-bis(2,6-diisopropylphenyl)acenaphthyl nickel(II) bis (hexafluoroacetylacetonate);

[(Me$_2$Ph)$_2$DABH$_2$]Ni(acac)$_2$-N,N'-bis(2,6-dimethylphenyl)-1,2-ethylenediimine nickel(II) bis (acetylacetonate);

[(Me$_2$Ph)$_2$DABMe$_2$]Ni(acac)$_2$-N,N'-bis(2,6-dimethylphenyl)-2,3-butanediimine nickel(II); bis (acetylacetonate).

While this invention has been described in detail for the purpose of illustration, it is not to be construed as limited thereby but is intended to cover all changes and modifications within the spirit and scope thereof.

What which is claimed:

1. A process of producing a polyolefin having a multimodal molecular weight distribution comprising:

polymerizing under polymerization conditions in a polymerization zone at least one olefin in the presence of a catalyst system, said catalyst system comprising at least one cocatalyst and at least two different catalysts selected from the group consisting of diimine nickel (II) complexes and diimine palladium (II) complexes, wherein said diimine complexes comprise additional ligands selected from the group consisting of α-deprotonated-β-diketones and α-deprotonated-β-ketoesters; and recovering a polyolefin having a multimodal molecular weight distribution.

2. The polymerization process according to claim 1, wherein the catalyst composition according to claim 1 wherein said catalysts are selected from the group consisting of diimine nickel (II) complexes having a formula selected from the group consisting of Ni(NCR'C$_6$R$_2$H$_3$)$_2$(E$_2$C$_3$R"$_2$Q)X and Ni(NCR'C$_6$R$_2$H$_3$)$_2$(E$_2$C$_3$R"$_2$Q)$_2$, wherein each R is independently selected from the group consisting of hydrogen, alkyl groups having from about 1 to about 10 carbon atoms per alkyl group, and said alkyl groups are branched or linear, wherein said aromatic groups are phenyl a substituted phenyl groups, and wherein the R substituents of a given complex may be the same or different;

wherein each R' is independently selected from the group consisting of hydrogen, linear, branched, cyclic aliphatic hydrocarbon radicals, and aromatic radicals having from about 1 to about 70 carbon atoms per radical group and wherein the R' substituents on a given complex can be the same or different;

wherein each E$_2$C$_3$R"$_2$Q is independently selected from the group consisting of α-deprotonated-β-diketones and α-deprotonated-β-ketoesters and wherein R" and Q on a given complex can be the same or different and are selected from the group consisting of hydrogen and linear, branched, cyclic aliphatic and aromatic radicals having from about 1 to about 10 carbon atoms per radical, optionally containing atoms other than carbon and hydrogen;

wherein each E can be the same or different and is selected from the group consisting of oxygen, sulfur, or selenium; and wherein each X can be the same or different and is a halogen selected from the group consisting of fluorine, chlorine, bromine, and iodine.

3. A process according to claim 1 wherein said catalyst system comprises at least one diimine nickel complex having at least one R' substituent that is different than an R' substituent of at least one other diimine nickel complex.

4. A process according to claim 1 wherein said catalyst system comprises at least one diimine nickel complex having at least one R substituent that is different than an R substituent of at least one other diimine nickel complex.

5. A process according to claim 1 wherein said catalyst system comprises a first diimine nickel complex and a second diimine nickel complex, and said first diimine nickel complex is selected from the group consisting of N,N'-bis(2,6-diisopropylphenyl)-1,2-ethylenediimine nickel (II) bis(hexafluoroacetylacetonate), N,N'-bis(2-isopropylphenyl)-2,3-butanediimine nickel(II) bis(hexafluoroacetylacetonate), and N,N'-bis(2,6-dimethylphenyl)-1,2-ethylenediimine nickel(II) bis(hexafluoroacetylacetonate), and said second diimine nickel complex is N,N'-bis(2,6-diisopropylphenyl)-1,2-butanediimine nickel (II) bis(hexafluoroacetylacetonate).

6. A process according to claim 1 wherein said olefin is selected from the group consisting of ethylene, propylene and mixtures thereof, and the recovered polymer is has a multimodal molecular weight distribution.

7. A process according to claim 1 wherein said olefin is ethylene and the recovered polymer has a bimodal molecular weight distribution.

8. A process according to claim 1 wherein said catalyst system comprises methylaluminoxane as a co-catalyst.

9. A process according to claim 1 wherein said catalyst system comprises a first diimine nickel complex and a second diimine nickel complex, and at least one of said first and second diimine nickel complexes is represented by a formula selected from the group consisting of

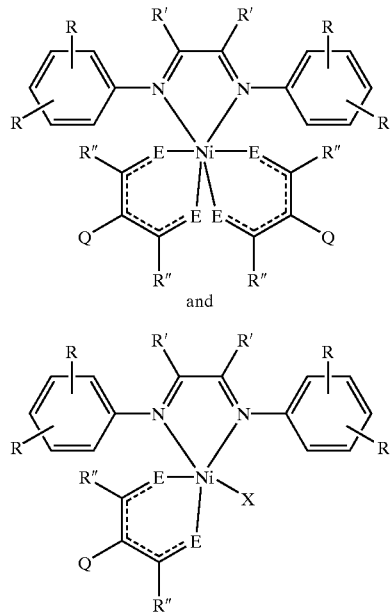

and wherein R, R', $E_2C_3R''Q$, and X are defined as set forth in claim 2.

10. A process according to claim 9 wherein said first and second diimine nickel complexes are both represented by one of the formulas.

11. A process according to claim 9 wherein at least one of the R substituents of said first diimine nickel complex are both methyl and at least one of the R substituents of said second diimine nickel complexes is selected from the group consisting of ethyl, propyl, isopropyl, butyl, isobutyl, tert-butyl, benzyl, phenyl groups, and mixtures of two or more thereof.

12. A process according to claim 9 wherein both R substituents of said first diimine nickel complex are both methyl groups and both R substituents of said second diimine nickel complex are isopropyl groups.

13. A process according to claim 9 wherein at least one of the R' substituents of said first diimine nickel complex is hydrogen and at least one of the R' substituents of said second diimine nickel complexes is selected from the group consisting of methyl groups, ethyl groups, propyl groups, phenyl groups, acenaphthyl groups, cyclobutadienyl groups and mixtures thereof.

14. A process according to claim 13 wherein both R' substituents of said first diimine nickel complex are hydrogen and both R' substituents of said second diimine nickel complex are methyl groups.

15. A process according to claim 9 wherein said $E_2C_3R''Q$ is hexafluoroacetylacetonate.

16. A process according to claim 9 wherein said diimine nickel complexes and said methylaluminoxane are present in sufficient amounts to provide an aluminum to nickel molar ratio within a range of about 50:1 to about 1200:1.

17. A process according to claim 1 wherein said process is a slurry polymerization process comprising reactor conditions of a reaction temperature within a range of about 10° to about 90° C. and a pressure within a range of about 100 to about 1000 psia.

18. A catalyst composition comprising
a first diimine nickel complex and a second diimine nickel complex, said first and second diimine nickel complexes each having a formula selected from the group consisting of

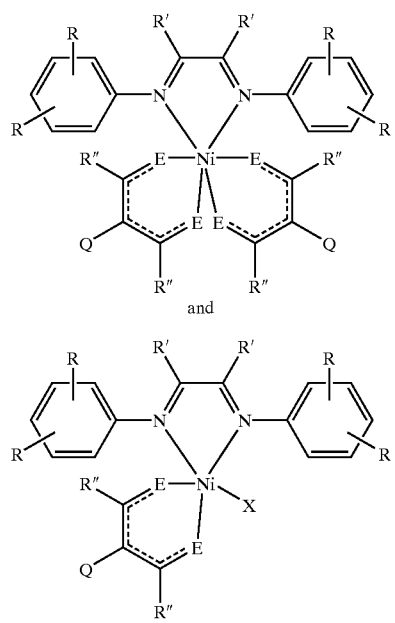

and wherein each R is independently selected from the group consisting of hydrogen, alkyl groups and aromatic groups, wherein said alkyl groups have from about 1 to about 10 carbon atoms per alkyl group, and said alkyl groups are branched or linear, and wherein the R substituents of a given complex are the same or different;

wherein each R' is independently selected from the group consisting of hydrogen, linear, branched, cyclic, aliphatic hydrocarbon radicals, and aromatic hydrocarbon radicals having from about 1 to about 70 carbon atoms per radical group and wherein the R' substituents on a given complex are the same or different;

wherein each $E_2C_3R''Q$ is independently selected from the group consisting of α-deprotonated-β-diketones and α-deprotonated-β-ketoesters, and wherein R'' and Q on a given complex are the same or different and are selected from the group consisting of hydrogen, linear, branched, or cyclic, aliphatic radicals, and aromatic radicals having from about 1 to about 10 carbon atoms per radical, optionally containing atoms other than carbon and hydrogen;

wherein each E is the same or different and is selected from the group consisting of oxygen, sulfur, and selenium; and wherein each X is the same or different and is a halogen selected from the group consisting of fluorine, chlorine, bromine, and iodine, and wherein said first diimine nickel complex is different from said second diimine nickel complex, and said catalyst composition further comprises a co-catalyst.

19. A catalyst composition according to claim 18 wherein said first diimine nickel complex has a lower molecular weight than said second diimine nickel complex.

20. A catalyst composition according to claim 18 resulting from the combination of an alkyl aluminoxane cocatalyst, a first nickel compound selected from the group consisting of N,N'-bis(2,6-diisopropylphenyl)-2,3-butanediimine bis(1,1,1,5,5,5-hexafluoro-2,4-pentanedionate) nickel (II), N,N'-bis(2,6-diisopropylphenyl)acenapthylenediimine bis(1,1,1,5,5,5-hexafluoro-2,4-pentanedionate) nickel (U), and N,N'-bis(2,6-diisopropylphenyl)-1,2-propanediimine)bis(1,1,1,5,5,5-hexafluoro-2,4-pentanedionate) nickel (II), and a second nickel compound selected from the group consisting of N,N'-bis(2-diisopropylphenyl)ethylenediimine bis(1,1,1,5,5,5-hexafluoro-2,4-pentanedionate) nickel (II), N,N'-bis(2-isopropylphenyl-2,3-butanediimine bis(1,1,1,5,5,5-hexafluoro-2,4-pentanedionate nickel (II), N,N'-bis(2-isopropylphenyl)-2,3-butanediimine bis(2,4-pentanedionate) nickel (II), and N,N'-bis(2,6-dimethylphenyl)ethylenediimine bis( 1,1,1,5,5,5-hexafluoro-2,4-pentanedionate) nickel (II).

21. A composition according to claim 18 wherein the R' substituents of said first diimine nickel complex are both hydrogen and at least one of the R' substituents of said second diimine nickel complex is selected from the group consisting of methyl, ethyl, propyl, phenyl, acenaphthyl, and cyclobutadienyl radicals.

22. A composition according to claim 18 wherein said first and second diimine nickel complexes each comprise at least one R' substituent selected from the group consisting of methyl, isopropyl, and wherein the R' substituents of said second diimine complex comprise more carbon atoms than the R' substituents of said first diimine complex.

23. A composition according to claim 18 wherein the R substituents of said first diimine nickel complex are both methyl and at least one of the R substituents of said second diimine nickel complexes is selected from the group consisting of ethyl, propyl, isopropyl, butyl, isobutyl, tert-butyl, benzyl, and phenyl groups.

24. A composition according to claim 18 wherein the R' substituents of said first and second diimine nickel complexes are selected from the group consisting of hydrogen, branched, linear, or cyclic aliphatic hydrocarbon radicals and aromatic hydrocarbon radicals having from about 1 to about 12 carbon atoms per radical.

25. A composition according to claim 18 wherein each said $E_2C_3R''Q$ is independently selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4-trifluoroacetoacetate, 1,1,1-trifluoro-5,5-dimethyl-2,4-pentanedione, ethyl alpha-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione; and Z is selected from the group consisting of chloride and bromide.

26. A composition according to claim 18 wherein each said $E_2C_3R''Q$ is hexafluoroacetylacetonate.

27. A composition according to claim 18 wherein the cocatalyst is methylaluminoxane and wherein said diimine nickel complexes and said methylaluminoxane are present in an amount to have an aluminum to nickel molar ratio of less than about 850:1.

28. A composition according to claim 18 wherein the cocatalyst comprises aluminum and the aluminum to nickel molar ratio is within a range of about 50:1 to about 600:1.

29. A composition according to claim 18 wherein said catalyst composition comprises one or more diimine nickel complexes in addition to said first diimine nickel complex and said second diimine nickel complex.

30. A catalyst composition according to claim 18 wherein one of the diimine nickel complexes has an N,N'-bis(2,6-diisopropylphenyl)-2,3-butanediimine ligand and the other has an N,N'-bis(2-isopropylphenyl)-2,3-butanediimine ligand.

31. A catalyst composition according to claim 18 wherein each diimine nickel complex has at least one 1,1,1,5,5,5-hexafluoro-2,4-pentanedionate ligand.

32. A catalyst composition according to claim 31 resulting from the combination of two different diimine nickel complexes each having at least one (1,1,1,5,5,5-hexafluoro-2,4-pentanedionate) ligand.

33. A catalyst composition according to claim 18 wherein one of the diimine complexes has an acenaphthylene diimine structure and the other has a structure selected from the group consisting of 2,3-butanediimine, ethylene diimine, and 1,2-propanediimine.

34. A catalyst composition resulting from the combination of at least two different complexes selected from the group consisting of diimine nickel and diimine palladium complexes and a cocatalyst selected from the group consisting of alkylaluminoxy compounds, trialkyl aluminum compounds, alkyl aluminum halide compounds, dialkyl zinc compounds, alkyl zinc halide compounds, and alkyl boron compounds, wherein each diimine nickel and palladium complex has at least one ligand selected from the group consisting of α-deprotonated-β-diketones and α-deprotonated-β-ketoesters.

35. A catalyst composition according to claim 34 wherein said first nickel compound is N,N'-bis(2,6-diisopropylphenyl)-2,3-butanediimine bis(1,1,1,5,5,5-hexafluoro-2,4-pentanedionate) nickel (II) and said second nickel compound N,N'-bis(2-isopropylphenyl-2,3-butanediimine bis(1,1,1,5,5,5-hexafluoro-2,4-pentanedionate nickel (II).

36. A catalyst composition according to claim 34 wherein said first nickel compound is N,N'-bis(2,6-diisopropylphenyl)-1,2-propanediimine bis(1,1,1,5,5,5-hexafluoro-2,4-pentanedionate) nickel(II) and said second nickel compound is N,N'-bis(2-isopropylphenyl)-2,3-butanediimine bis(2,4-pentanedionate) nickel(II).

37. A catalyst composition according to claim 34 wherein said first nickel compound is N,N'-bis(2,6-diisopropylphenyl)acenaphthylenediimine bis(1,1,1,5,5,5-hexafluoro-2,4-pentanedionate) nickel(II) and said second nickel compound is N,N'-bis(2-isopropylphenyl)-2,3-butanediimine bis(2,4-pentanedionate) nickel(II).

38. A catalyst composition according to claim 34 wherein said first nickel compound is N,N'-bis(2,6-diisopropylphenyl)-2,3-butanediimine bis(1,1,1,5,5,5-hexafluoro-2,4-pentanedionate) nickel (II) and said second nickel compound is N,N'-bis(2-isopropylphenyl)-2,3-butanediimine bis(2,4-pentanedionate) nickel (II).

39. A catalyst composition according to claim 34 wherein said first nickel compound is N,N'-bis(2,6-diisopropylphenyl)-2,3-butanediimine bis(1,1,1,5,5,5-hexafluoro-2,4-pentanedionate) nickel (II) and said second nickel compound is N,N'-bis(2,6-dimethylphenyl) ethylenediimine bis(1,1,1,5,5,5-hexafluoro-2,4-pentanedionate) nickel (II).

40. A catalyst composition according to claim 34 wherein said first nickel compound is N,N'-bis(2,6-diisopropylphenyl)-2,3-butanediimine bis(1,1,1,5,5,5-hexafluoro-2,4-pentanedionate) nickel (II) and said second nickel compound is N,N'-bis(2-diisopropylphenyl) ethylenediimine bis(1,1,1,5,5,5-hexafluoro-2,4-pentanedionate) nickel (II).

* * * * *